G. F. SMITH.

Thill-Coupling.

No. 6,331. Reissued March 9, 1875.

Witnesses
J. H. Shumway
C. V. Forbes

Geo. F. Smith
Inventor
By Atty.
John E. Earle

THE GRAPHIC CO. PHOTO-LITH. 39 & 41 PARK PLACE, N.Y.

UNITED STATES PATENT OFFICE.

GEORGE F. SMITH, OF PLANTSVILLE, CONNECTICUT.

IMPROVEMENT IN THILL-COUPLINGS.

Specification forming part of Letters Patent No. 149,535, dated April 7, 1874; reissue No. 6,331, dated March 9, 1875; application filed December 8, 1874.

*To all whom it may concern:*

Be it known that I, GEORGE F. SMITH, of Plantsville, in the county of Hartford and State of Connecticut, have invented a new Improvement in Carriage-Shaft Eye; and I do hereby declare the following, when taken in connection with the accompanying drawings and the letters of reference marked thereon, to be a full, clear, and exact description of the same, and which said drawings constitute part of this specification, and represent, in—

Figure 1:
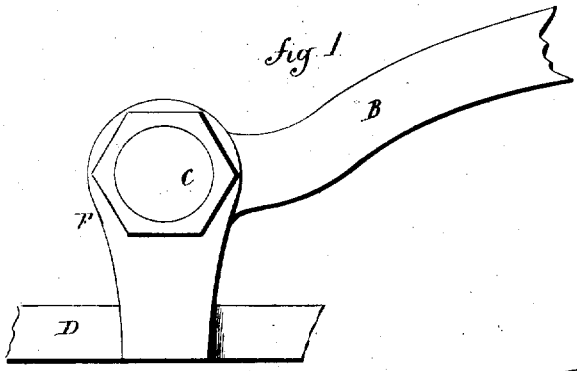
Figure 2:
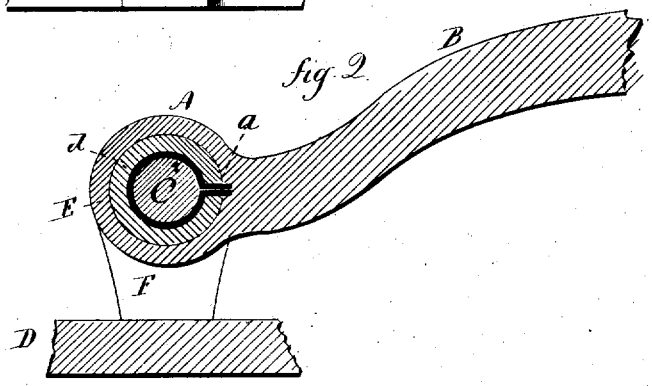

Figure 1, a side view; Fig. 2, a transverse section; and in Fig. 3, a longitudinal section.

This invention relates to an improvement in the eyes by which the shafts of a carriage are attached to the coupling, the object being to introduce the elastic material for preventing the rattle in the shackle within the shaft-eye, and yet prevent the wear which would naturally come upon the material in the movement of the shaft; and the invention consists in a cylinder of elastic material within the eye combined with a metal cylinder within the elastic cylinder, connected to said elastic cylinder by an external projection, so that in consequence of said projection the inner cylinder will be prevented from turning; also, in making interior of the shaft-eye conical, and the bolt of small or equal diameter, to facilitate the introduction of the elastic material, all as more fully hereinafter described.

A is the shaft-eye, formed on the iron B in the usual manner externally. The eye is bored out larger than the diameter of the bolt C, by which the eye is secured to the coupling D, the opening through the eye being of conical form, for the purpose hereinafter described. A sleeve or cylinder, E, (denoted in the solid black,) is formed from sheet or thin metal more or less elastic. The internal diameter is slightly less than that of the bolt C, so that the insertion of the bolt will slightly expand the cylinder. This cylinder is divided or split through one side and one or both edges, or a portion of the cylinder turned outward. The external diameter of the cylinder E is less than the internal diameter of the eye, so as to leave a space between the two, which is filled with the elastic material *d*, so as to press the cylinder close upon the bolt, and by the expansion of the cylinder E, when the bolt is introduced, will be compressed, so as to be forced outward against the ears F of the coupling, and against the internal surface of the eye, the friction between the elastic material and the eye being greater than that between the bolt and sleeve, and as the sleeve and elastic material are prevented from moving separately, both the sleeve and elastic material will turn with the eye.

In some cases, and, as shown, I connect the internal cylinder E with the eye by turning one or both edges of the internal cylinder, or a part thereof, out through the slit in the elastic material into a groove or notch in the shaft-eye.

While I believe this to be the best method of making the connection, so as to prevent wear upon the surface of the elastic material, other means of connection will be readily suggested to those skilled in the art.

This construction prevents the eye from rattling either in the coupling or on the bolt. The bolt should be made square through one ear or the other, to prevent it from turning with the eye.

By this construction the elastic material is protected from all wear, the cylinder E only being exposed to that, and in case the cylinder should wear it is easily removed, but will last many times longer than the elastic material if exposed to the same wear.

Figure 3:
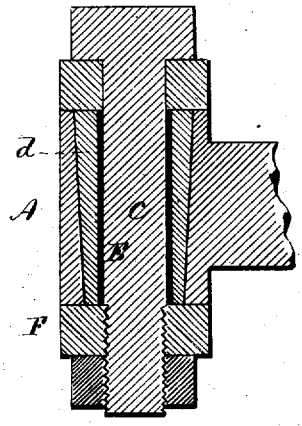

It is difficult to introduce the elastic material into the opening in the eye if the opening be of equal diameter throughout. I therefore make the opening in the eye conical, or less in diameter at one end than the other, and the bolt of equal diameter throughout, but less than the least diameter of the eye, as seen in Fig. 3. This is particularly desirable when the elastic material is cut from a flat sheet. In that case the piece is cut narrower at one end than the other, the width at each end corresponding to the circumference of the opening in the eye; then when the piece is rolled into cylindrical form it is easily inserted and pressed into the eye. The material will yield to the internal cylinder as that is forced in, so that the slight conicality does not appear in the cylinder.

I do not wish to be understood as claiming the introduction of the elastic or "anti-rattling" material within the shaft-eye, as such, I am aware, is not new.

I claim as my invention—

1. The combination of the internal cylinder E, with elastic material *d*, and the shaft-eye A, the cylinder being divided, and a portion of it extending outward into the elastic material, substantially as and for the purpose described.

2. The combination of the internal cylinder E, and elastic material *d* with the shaft-eye A, the cylinder extending into connection with the shaft-eye, substantially as described.

GEO. F. SMITH.

Witnesses:
JOHN E. EARLE,
C. W. FORBES.